(12) United States Patent
Pan et al.

(10) Patent No.: US 11,874,424 B2
(45) Date of Patent: Jan. 16, 2024

(54) DETERMINING FORMATION PROPERTIES BASED ON MULTI-COMPONENT AZIMUTHAL MEASUREMENTS

(71) Applicant: Halliburton Energy Services, Inc., Houston, TX (US)

(72) Inventors: Li Pan, Singapore (SG); Jin Ma, Houston, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 17/594,518

(22) PCT Filed: May 23, 2019

(86) PCT No.: PCT/US2019/033815
§ 371 (c)(1),
(2) Date: Oct. 20, 2021

(87) PCT Pub. No.: WO2020/236184
PCT Pub. Date: Nov. 26, 2020

(65) Prior Publication Data
US 2022/0214470 A1 Jul. 7, 2022

(51) Int. Cl.
*G01V 3/26* (2006.01)
*G01V 3/38* (2006.01)

(52) U.S. Cl.
CPC . *G01V 3/26* (2013.01); *G01V 3/38* (2013.01)

(58) Field of Classification Search
None
See application file for complete search history.

(56) References Cited

U.S. PATENT DOCUMENTS

| 8,954,280 B2 | 2/2015 | Li et al. |
| 10,087,744 B2 | 10/2018 | Wu |

(Continued)

FOREIGN PATENT DOCUMENTS

WO 2020236184 A1 11/2020

OTHER PUBLICATIONS

PCT Application No. PCT/US2019/033815, International Search Report dated Feb. 20, 2020, 4 pages.

(Continued)

*Primary Examiner* — Lina Cordero
(74) *Attorney, Agent, or Firm* — DeLizio, Peacock, Lewin & Guerra, LLP

(57) ABSTRACT

A geosignal is calculated based on a signal detected by a multicomponent resistivity tool (101) to facilitate determination of formation properties and infer location of the resistivity tool with respect to formation boundaries. The resistivity tool (101) detects an electromagnetic field response signal (109) at a series of azimuth angles (111) during one tool rotation. The signal measured at each azimuth angle is decoupled to obtain nonzero electromagnetic field tensor components for input into the geosignal calculation. The results of the geosignal calculation for at least a top bin (i.e., an azimuth angle of 360 degrees) and a bottom bin (i.e., an azimuth angle of 180 degrees) are evaluated to determine whether the tool (101) is near a formation boundary. If the tool is determined to be near a formation boundary, the resistivity of the layers of the formation on each side of the detected boundary can be inferred.

19 Claims, 7 Drawing Sheets

(56) References Cited

U.S. PATENT DOCUMENTS

| | | | |
|---|---|---|---|
| 10,295,697 B2* | 5/2019 | Wu | G01V 3/38 |
| 2009/0018775 A1 | 1/2009 | Tabarovsky et al. | |
| 2010/0030477 A1 | 2/2010 | Yang et al. | |
| 2011/0133740 A1 | 6/2011 | Seydoux et al. | |
| 2011/0254552 A1* | 10/2011 | Wu | G01V 3/28 |
| | | | 324/339 |
| 2012/0283951 A1 | 11/2012 | Li et al. | |
| 2015/0260872 A1* | 9/2015 | Hou | G01V 3/20 |
| | | | 702/7 |
| 2015/0369952 A1* | 12/2015 | Wu | G01V 3/38 |
| | | | 702/7 |
| 2016/0024908 A1* | 1/2016 | Wu | E21B 47/026 |
| | | | 702/9 |
| 2017/0254921 A1 | 9/2017 | Wu et al. | |

OTHER PUBLICATIONS

PCT Application No. PCT/US2019/033815, Written Opinion dated Feb. 20, 2020, 6 pages.

* cited by examiner

DETERMINING FORMATION PROPERTIES BASED ON MULTI-COMPONENT AZIMUTHAL MEASUREMENTS

TECHNICAL FIELD

The disclosure generally relates to the field of obtaining oil, gas, water, soluble or meltable materials or a slurry of minerals from wells, and more particularly to surveying or testing.

BACKGROUND

Leveraging geosteering for optimal placement of a wellbore influences reservoir production and oil and/or gas recovery. Logging-while-drilling (LWD) applications in a borehole can be used to obtain azimuthal resistivity measurements. Downhole resistivity measurements facilitate determination of the structure and properties of the surrounding geological formation, which serves to inform the direction of drilling. A resistivity tool for such LWD resistivity measurements includes at least one transmitter-receiver pair for transmitting electromagnetic radiation into the formation and detecting the formation response signal for subsequent decoupling of the measured electromagnetic field components. The decoupled components can be used as inputs for calculating a geosignal to facilitate geosteering operations.

BRIEF DESCRIPTION OF THE DRAWINGS

Embodiments of the disclosure may be better understood by referencing the accompanying drawings.

DESCRIPTION OF EMBODIMENTS

Figure 1:
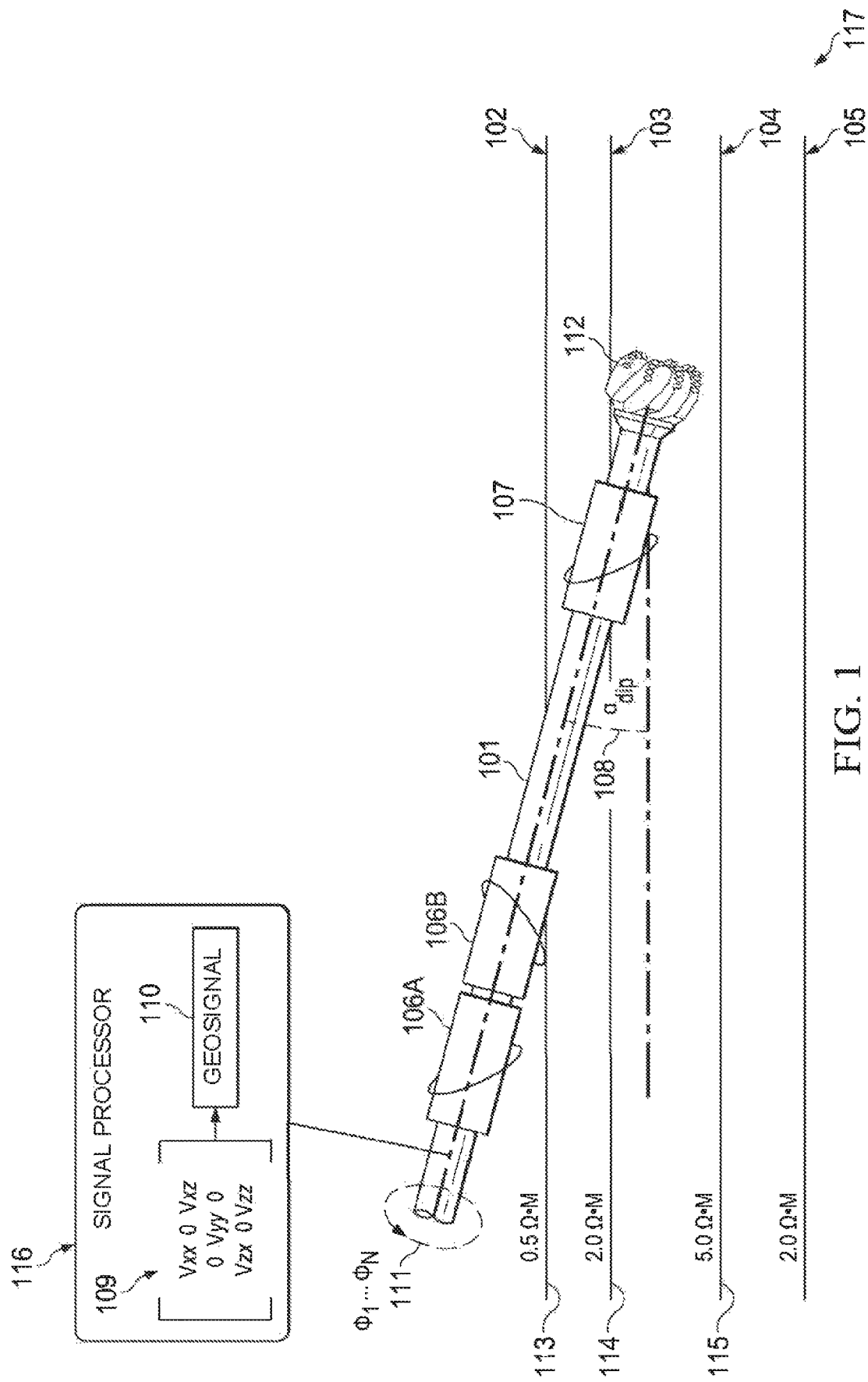
FIG. 1 depicts an example apparatus for determining a location of a resistivity tool with respect to formation boundaries and evaluating the surrounding layers of the formation based on calculation of a geosignal.

The description that follows includes example systems, methods, techniques, and program flows that embody aspects of the disclosure. However, it is understood that this disclosure may be practiced without these specific details. For instance, this disclosure refers to determining location of a downhole tool with respect to formation boundaries and properties of formation layers surrounding the boundaries during geosteering operations in illustrative examples. Aspects of this disclosure can be also applied to any other applications or operations in which location of a downhole tool with respect to formation boundaries is determined. In other instances, well-known instruction instances, protocols, structures and techniques have not been shown in detail in order not to obfuscate the description.

Overview

A geosignal is calculated based on a signal detected by a multicomponent resistivity tool to facilitate accurate determination of formation properties and infer location of the resistivity tool with respect to formation boundaries. Formation boundaries occur between layers of the formation with differing resistivities. The resistivity tool detects an electromagnetic field response signal at a series of azimuth angles during one tool rotation. The signal measured at each azimuth angle is decoupled to obtain nonzero electromagnetic field tensor components for input into the geosignal calculation. Multiple nonzero electromagnetic field tensor components can be decoupled to yield increased accuracy in the geosignal calculation as a result of leveraging the multicomponent resistivity tool rather than a tool which may limit component decoupling. The results of the geosignal calculation for at least a top bin (i.e., an azimuth angle of 360 degrees) and a bottom bin (i.e., an azimuth angle of 180 degrees) are evaluated to determine whether the tool is near a formation boundary. If the tool is determined to be near a formation boundary, the resistivity of the layers of the formation on each side of the detected boundary can be inferred.

Evaluation of the geosignal is based on the observed phase and/or attenuation of the calculated geosignal. Properties of the phase and attenuation curves indicate whether the tool is near or approaching a formation boundary at which the relative resistivities of the layers on either side of the formation boundary differ as well as if the tool is crossing a formation boundary at a particular measured depth. For instance, the phase and/or attenuation of the geosignal may indicate that the tool is near a formation boundary where the upper layer has a higher resistivity and the lower layer has a lower resistivity. The observed phase and attenuation may also indicate that the tool is distant from any formation boundaries. Accurate determination of tool location with respect to formation boundaries serves to inform geosteering operations while drilling and facilitates assessment of the properties of the surrounding formation. For example, based on the identified formation properties with respect to the current drill bit position, it may be determined to geosteer the drill bit to remain in the current formation layer or to be directed towards an adjacent formation layer with different formation properties.

Example Illustrations

FIG. 1 depicts an example apparatus for determining a location of a resistivity tool with respect to formation boundaries and evaluating the surrounding layers of the formation based on calculation of a geosignal. A resistivity tool 101 ("tool 101") transmits and detects electromagnetic signals during downhole LWD operations to evaluate a surrounding formation 117. The formation 117 can be composed of multiple layers with varying resistivities, where a formation boundary is defined as the boundary between two layers with varying resistivities. For instance, in FIG. 1, the formation 117 is composed of layers 102, 103, 104, and 105. The layers 102-105 are separated by formation boundaries 113, 114, and 115. The drill bit 112 may be geosteered such that the trajectory of the tool 101 intersects the formation boundaries 113-115 and/or remains in one of the formation layers 102-105.

The tool 101 is a multicomponent tool which includes at least one transmitter and at least one receiver, each of which are arranged to transmit and receive signals in one or more directions. In the example depicted in FIG. 1, the tool 101 includes a transmitter 107 located above a drill bit 112 and two receivers 106A and 106B located above the transmitter 107. The transmitter 107 and/or receivers 106A-B may include tilted coil antennas at an angle of tilt determined by the angle between the normal vector formed in the plane of the transmitter 107 or receivers 106A-B and the longitudinal axis of the tool 101. Coils of the transmitter 107 or receivers 106A-B may be a conductive wire (e.g., copper or aluminum) and may be formed around a magnetic or non-magnetic core. A relative dip angle (αdip) 108 may exist as a result of inclination of the tool 101. The relative dip angle 108 is the difference between the inclination of the tool 101 and the dip of the formation 117. The inclination of the tool 101 may be provided by survey tools. The formation 117 dip may be obtained from additional tools, such as an additional resistivity tool.

The transmitter 107 transmits electromagnetic signals into the surrounding formation 117. Signals may be transmitted near the tool 101, in regions in front of the tool 101, in regions behind the tool 101, and/or regions adjacent to the tool 101. The receivers 106A-B detect the electromagnetic signal which has traversed the formation 117. Transmitter-receiver pairs may be activated such that one or both of the receivers 106A-B are active at a given time. The tool 101 can be rotated about its longitudinal axis during electromagnetic signal transmission and detection operations. The receivers 106A and/or 106B detect a signal at each of a series of N azimuthal positions 111 ($\Phi_1 \ldots \Phi_N$ in FIG. 1) throughout the rotation of the tool 101. The detected signal may be received as voltage measurements, current measurements, etc. Receivers are activated for signal detection at each azimuthal position $\Phi_i$ of the N azimuthal positions 111, where i iterates from 1 to N, and N is a nonzero positive integer. For example, for N=32 where the set of azimuthal positions $\Phi$ is symmetric, the signal is received at each of 32 azimuthal angles $\Phi_1$ through $\Phi_{32}$ (i.e., $\Phi_1$=11.25 degrees, $\Phi_2$=22.5 degrees, ... $\Phi_{32}$=360 degrees). The resulting measurements are recorded in N bins, where each bin corresponds to a measurement recorded for a particular azimuthal position $\Phi_i$.

An electromagnetic field tensor 109 representing the detected signal is output to a signal processor 116 as a result of signal transmission and detection operations. The electromagnetic field tensor 109 indicates components of the detected signal detected by the receivers 106A-B and can be represented as a 3-by-3 matrix:

$$\begin{bmatrix} V_{xx} & 0 & V_{xz} \\ 0 & V_{yy} & 0 \\ V_{zx} & 0 & V_{zz} \end{bmatrix}$$

where each $V_{ij}$ represents a component of the detected signal for an orientation of the receiver 106A or 106B in a direction "j" when it receives a signal as a result of a transmitter oriented in a direction "i" transmitting a signal into the formation 117. For example, the $V_{zx}$ component indicates that the receiver 106A or 106B is oriented in an x-direction of a tool coordinate system when it receives a signal as a result of the transmitter 107 oriented in a z-direction of the tool coordinate system. In the tool coordinate system, a z-axis aligns with the tool 101 axis, an x-axis is perpendicular to the z-axis with its positive direction directed towards the tool 101 high side, and a y-axis is perpendicular to the x-axis and z-axis.

In the example depicted in FIG. 1, the layers 102, 103, 104, and 105 which form the formation 117 exhibit resistivities of 0.5 Ω·m, 2.0 Ω·m, 5.0 Ω·m, and 2.0 Ω·m, respectively. The formation boundary 113 exists between layers 102 and 103 due to the lower resistivity 0.5 Ω·m of layer 102 and the higher resistivity 2.0 Ω·m of the layer 103. The formation boundary 114 exists between layers 103 and 104 due to the lower resistivity 2 Ω·m of layer 103 and the higher resistivity 5.0 Ω·m of layer 104. The formation boundary 115 exists between layers 104 and 105 due to the higher resistivity 5.0 Ω·m of the layer 104 and the lower resistivity 2.0 Ω·m of the layer 105.

To determine if the tool 101 is near or crossing one of the boundaries 113, 114, or 115, the signal processor 116 decouples components of the electromagnetic field tensor 109 and computes a geosignal 110. The signal processor 116 may be downhole as depicted in FIG. 1 or at the surface of the formation 117. The tool 101 outputs the electromagnetic field tensor 109 to the signal processor 116 for decoupling the nonzero components $V_{xx}$, $V_{xz}$, $V_{yy}$, $V_{zy}$, and $V_{zz}$ from the detected signal. The geosignal 110 corresponding to the decoupled components determined for azimuth angle $\Phi_i$ and with a relative dip angle α is calculated with the formula in Equation 1 as follows.

$$V_r^{geo} = \frac{\left(-\sin\frac{\alpha}{2}\sin\frac{3\alpha}{2}\cos^2\phi_i V_{xx} - \sin\frac{\alpha}{2}\sin\frac{3\alpha}{2}\sin^2\phi_i V_{yy} - \cos\frac{3\alpha}{2}\cos\frac{\alpha}{2}V_{zz} + \sin\frac{\alpha}{2}\cos\frac{3\alpha}{2}\cos\phi_i V_{xz} + \sin\frac{3\alpha}{2}\cos\frac{\alpha}{2}\cos\phi_i V_{zx}\right)}{\left(-\sin\frac{\alpha}{2}\sin\frac{3\alpha}{2}\cos^2\phi_i V_{xx} - \sin\frac{\alpha}{2}\sin\frac{3\alpha}{2}\sin^2\phi_i V_{yy} - \cos\frac{3\alpha}{2}\cos\frac{\alpha}{2}V_{zz} + \sin\frac{3\alpha}{2}\cos\frac{\alpha}{2}\cos\phi_i V_{xz} + \sin\frac{\alpha}{2}\cos\frac{3\alpha}{2}\cos\phi_i V_{zx}\right)}$$

The geosignal 110 may be calculated based on azimuthal bin data for each of the azimuthal positions 111 (i.e., for the detected signal at each position $\Phi_1$ through $\Phi_N$) or for a subset of the azimuthal bin data for azimuthal positions 111. For instance, the geosignal 110 may be calculated for a top data bin and a bottom data bin. The top data bin is the signal detected at the azimuth angle $\Phi_i$ corresponding to a full rotation of the tool 101 (e.g., 0 degrees or 360 degrees). The bottom data bin is the signal detected at the azimuth angle $\Phi_i$ corresponding to a half rotation of the tool 101 (e.g., 180 degrees). For example, when activating the transmitter 107 and receivers 106A-B for signal transmission and detection at N azimuthal positions where N=32, data bin 32 is the top data bin, and data bin 16 is the bottom data bin.

Inferences about the position of the tool 101 relative to the formation layers 102-105 and/or the formation boundaries 113-115 can be made by evaluating properties of the geosignal 110. The phase and/or attenuation of the geosignal 110 are plotted for at least a subset of the azimuthal bin data collected at the azimuthal positions 111. For instance, for N=32, the phase and attenuation may be plotted for the geosignal 110 calculated for $\Phi_{16}$ and $\Phi_{32}$ (i.e., the top and bottom bins). Observed properties of the phase and/or attenuation (e.g., negative or positive, existence of a relative extremum) indicate whether the tool 101 is far from any of the formation boundaries 113-115, near one of the boundaries 113-115, or crossing one of the formation boundaries 113-115. Based on determining that the tool 101 is near one of the formation boundaries 113-115, an additional evaluation of the resistivities of the formation layers on each side of the proximate boundary can be made based on the phase and/or attenuation properties.

Figure 2:
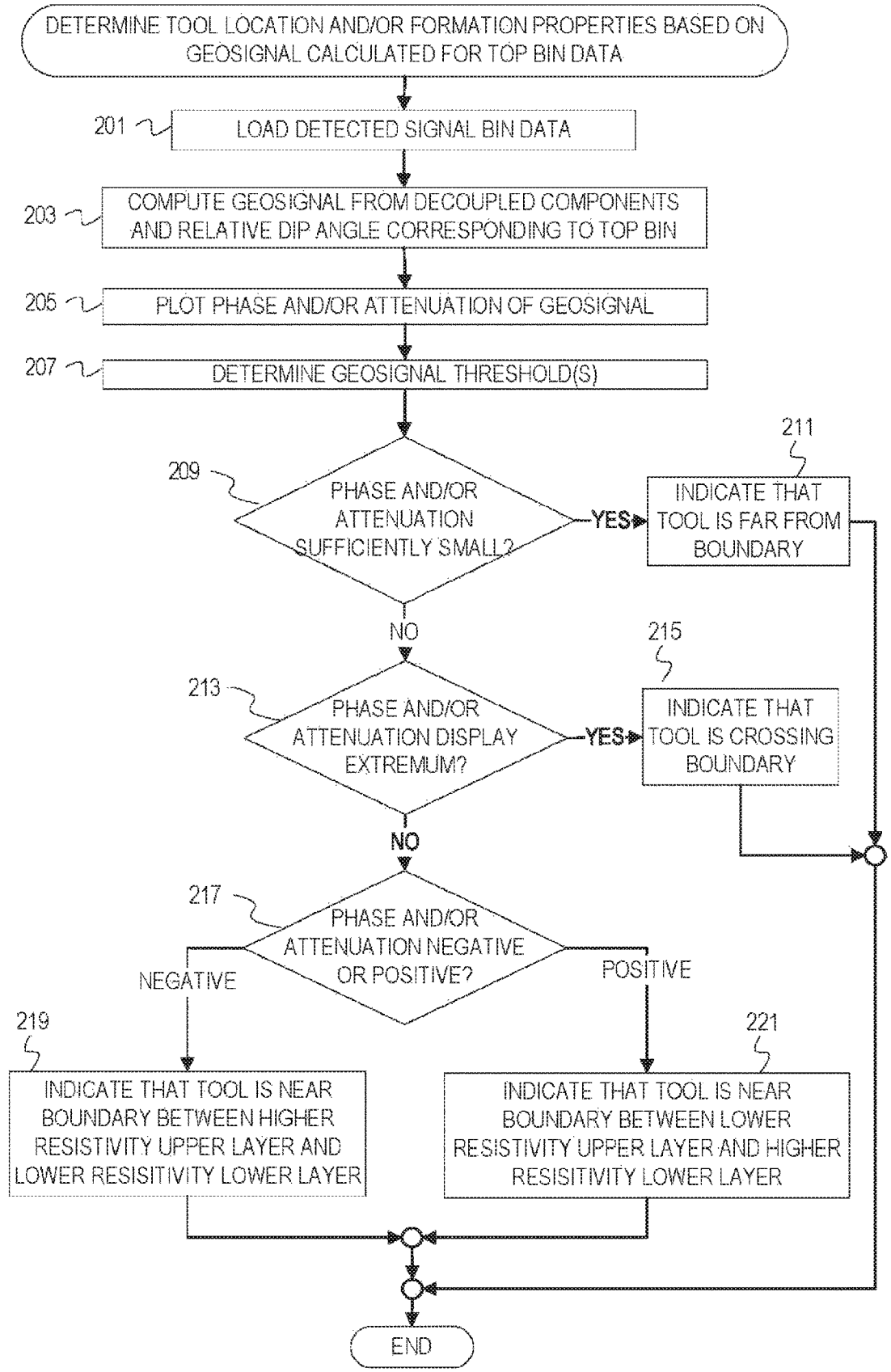
FIG. 2 is a flowchart of example operations for determining the location of a multicomponent resistivity tool with respect to formation boundaries based on evaluating geosignal properties.

FIG. 2 is a flowchart of example operations for determining the location of a multicomponent resistivity tool with respect to formation boundaries based on evaluating geosignal properties. The example operations indicate inferences which are made based on data collected at an azimuth angle corresponding to a top data bin. The top data bin may include the data measured at an azimuth angle of 0 or 360 degrees with respect to rotation of the multicomponent resistivity tool (hereinafter "the tool"). For instance, for N=32 bins, the top data bin is bin 32. The operations can be performed when the tool is located at a logging point at a particular measured depth in the formation for one or more receivers. The example operations refer to a signal processor as performing the depicted operations for consistency with FIG. 1, although naming of software and program code can vary among implementations. The indications of inferred location of the tool with respect to a formation boundary (e.g., far, near, crossing) can take different forms. The indicating may be updating a user interface or digital map to express the indication (e.g., changing a color, displaying a notification, etc.). The indicating may be inserting data or a data marker that is communicated to a display engine or user interface to be rendered/interpreted by the display engine or user interface. The data provided to a graphical user interface or geosteering interface for display can be considered geosteering data since it can inform geosteering. Further, the location qualifier "far" and "near" and "approaching" with respect to a formation boundary corresponds to whether or not a geosteering decision is to be made and not directly related to a scalar distance, although a geosteering decision takes distance from a boundary into account.

The signal processor loads receiver response data collected at each azimuth angle (201). The tool outputs a nine-component tensor to the signal processor which includes five nonzero components $V_{xx}$, $V_{yy}$, $V_{zz}$, $V_{xz}$, and $V_{zx}$. The tool may output the tensor to the signal processor after each azimuthal measurement or after each of the N azimuthal measurements has been taken.

The signal processor computes a geosignal from the components decoupled from the signal and relative dip angle for the top bin data (203). The geosignal for the components $V_{xx}$, $V_{yy}$, $V_{zz}$, $V_{xz}$, and $V_{zx}$ of a receiver response at an azimuth angle $\Phi_i$ and a formation dip angle $\alpha$ is calculated with the formula previously depicted in Equation 1.

The signal processor plots the phase and/or attenuation of the calculated geosignal (205). The phase and/or attenuation can be plotted with respect to the measured depth corresponding to the calculated geosignal. The phase and/or attenuation may be plotted in a singular plot for the top bin, plotted for a group of bins in addition to the top bin (e.g., bins 16 through 32 for N=32 bins), plotted for both a combination of bins which includes the top bin, etc. For instance, the phase and/or attenuation can be plotted as a function with respect to the measured depth. The phase and/or attenuation can also be plotted as a heat map indicating the values of the phase and/or attenuation with respect to the measured depth for one or more data bins. When evaluating the geosignal properties, the phase or attenuation may be evaluated individually or in combination.

The signal processor determines one or more geosignal thresholds for evaluation (207). A geosignal evaluation threshold may be enforced for determining whether a phase and/or attenuation of a small magnitude can be attributed to noise. Geosignal thresholds may also be enforced for determining a minimum phase and/or attenuation at which the results are indicative of the tool position with respect to tool boundaries. The geosignal thresholds are implemented in subsequent steps for inferring position of the tool. Thresholds can be predetermined prior to collecting or loading receiver response data at each logging point or after calculating the geosignal. For instance, after calculating the geosignal, a geosignal phase threshold of five degrees may be established. A geosignal attenuation threshold of three decibels may also be established. Because phase and/or attenuation may be negative, absolute values may be considered when determining whether the geosignal threshold is satisfied. Thresholds can be based on past observations resulting from geosignal evaluation operations.

The signal processor determines whether the phase and/or attenuation are sufficiently small to indicate that the tool is far from formation boundaries (209). The determination that the phase and/or attenuation are sufficiently small is based on an enforced geosignal threshold. For instance, the geosignal threshold may be a maximum magnitude at which the phase and/or attenuation can be leveraged as a basis for inferring that the tool is approaching a formation boundary and therefore are not considered to be sufficiently small. An initial evaluation threshold may also be enforced to determine whether the small magnitude of the observed phase and/or attenuation can be attributed to noise or other sources of variation which are not a direct result of formation characteristics.

If the phase and/or attenuation are considered to be sufficiently small (in this case does not satisfy the geosignal threshold), the signal processor indicates that the tool is far from formation boundaries (211). The geosignal threshold has been chosen to be a value below which phase and/or attenuation is presumed to be noise and not an indication that the tool is approaching a formation boundary. The tool may be far from a boundary if it is not actively approaching a boundary, if the resistivity of the formation layer bordering the nearest formation boundary cannot be detected, etc. Embodiments may not make any indication that the tool is far from a formation boundary. With reference to a graphical user interface (GUI) for geosteering, the data indicating/inferring location may continue to be communicated to the geosteering GUI without an explicit indication that the tool far or not near a formation boundary. Since the tool is not near or crossing a formation boundary, it is implied that the tool is far from a formation boundary. Far and near being relative to whether or not a geosteering decision is to be made.

If the phase and/or attenuation are not sufficiently small e.g., satisfies or exceeds the geosignal threshold), the signal processor determines if the phase and/or attenuation at the current measured depth display a local extremum (213). Local extrema may be negative or positive. The phase and/or attenuation observed at the measured depths preceding the current measured depth may be evaluated to determine if a local extremum is present. Local extrema can be determined by evaluating the phase and/or attenuation observed at measured depths within a window created by two consecutive points at which the phase and/or attenuation is equal to the geosignal threshold. For example, if the geosignal phase threshold is five degrees, the window may be created between the consecutive points at which the phase is observed to be equal to five degrees. The local extremum can then be determined by evaluating the observed phase within the resulting window.

If the phase and/or attenuation display a local extremum, the signal processor indicates that the tool is determined to be crossing a formation boundary (215). The presence of a local extremum indicates that the tool is located at a formation boundary between two formation layers, each of which have a different resistivity. For instance, the tool may be crossing between a formation layer with a high resistivity and a formation layer with a low resistivity. As an example, the tool may be crossing from an upper layer with a resistivity of 4 Ω·m to a lower layer with a resistivity of 0.5 Ω·m.

If the phase and/or attenuation do not display a local extremum, the signal processor determines whether the phase and/or attenuation are negative or positive (217). The determination can be made based on evaluating the plotted phase and/or attenuation for the top bin at the current measured depth.

If the phase and/or attenuation are negative for the top bin, the signal processor indicates that the tool is determined to be near a formation boundary (219). The formation profile for the formation layers on each side of the proximate formation boundary can also be determined upon conclusion that the tool is near the boundary. A negative phase and/or attenuation indicates that the proximate formation boundary is between an upper layer with a higher resistivity and a lower layer with a lower resistivity. The results of the phase and/or attenuation analysis can be leveraged when determining whether to geosteer a drill bit of the tool towards the lower layer which exhibits the lower resistivity or to remain in the upper layer which exhibits the higher resistivity.

If the phase and/or attenuation are positive for the top bin, the signal processor indicates that the tool is determined to be near a formation boundary (221). The formation profile for the formation layers on each side of the proximate formation boundary can also be determined upon conclusion that the tool is near the boundary. A positive phase and/or attenuation indicates that the proximate formation boundary is between an upper layer with a lower resistivity and a lower layer with a higher resistivity. The results of the phase and/or attenuation analysis can be leveraged when determining whether to geosteer the drill bit towards the lower layer which exhibits a higher resistivity or to remain in the upper layer which exhibits the lower resistivity.

Figure 3:
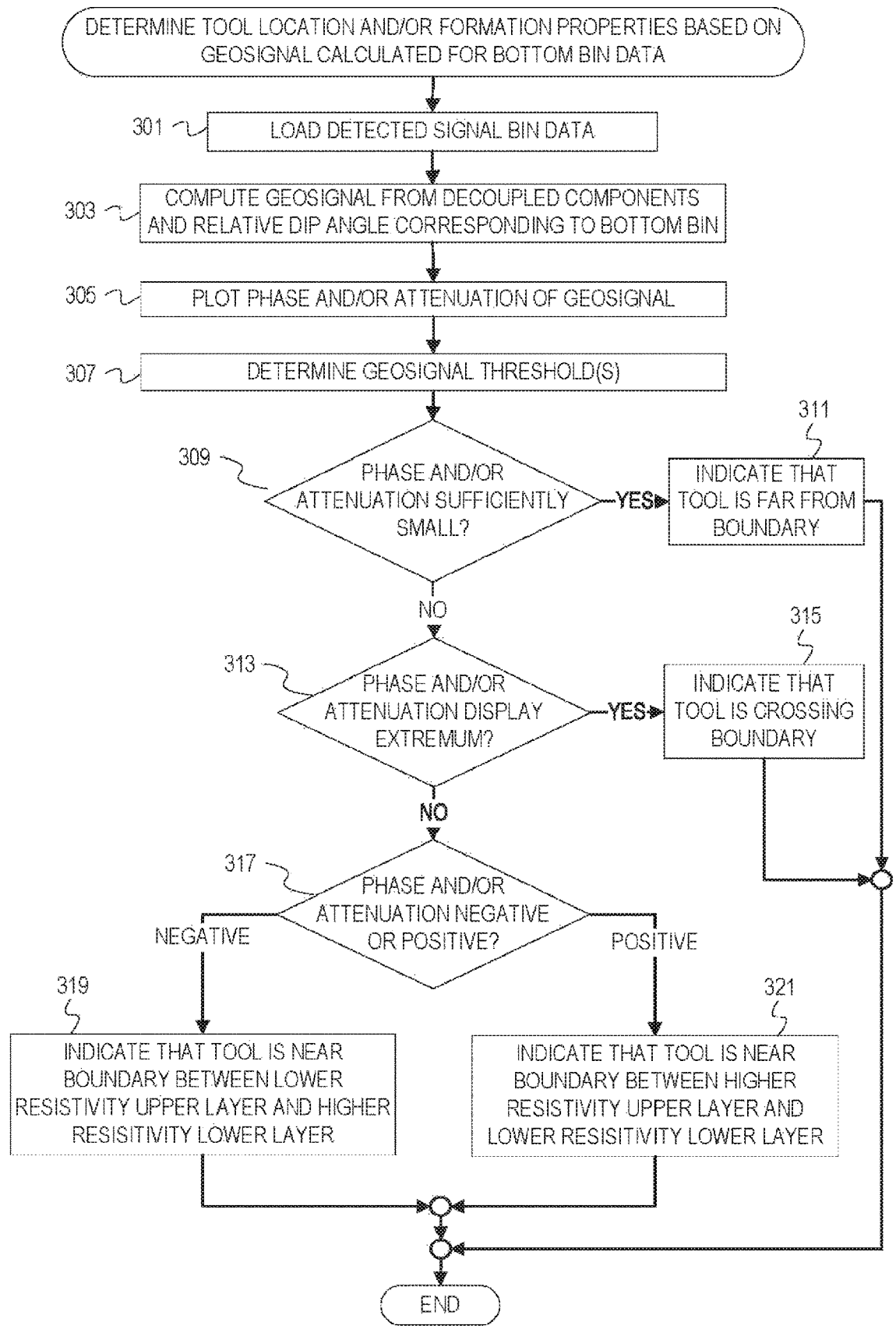
FIG. 3 is a flowchart of example operations for determining the location of a multicomponent resistivity tool with respect to formation boundaries based on evaluating geosignal properties.

FIG. 3 is a flowchart of example operations for determining the location of a multicomponent resistivity tool with respect to formation boundaries based on evaluating geosignal properties. The example operations indicate inferences which are made based on data collected at an azimuth angle corresponding to a bottom data bin. The bottom data bin may include the data measured at an azimuth angle of approximately 180 degrees with respect to rotation of the multicomponent resistivity tool (hereinafter "the tool"). For instance, for N=32 bins, the bottom data bin is bin 16. The operations can be performed when the tool is located at a logging point corresponding to a particular measured depth in the formation for one or more receivers. The example operations refer to a signal processor as performing the depicted operations for consistency with FIG. 1, although naming of software and program code can vary among implementations.

The signal processor loads receiver response data collected at each azimuth angle (301). The tool outputs a nine-component tensor to the signal processor which includes five nonzero components $V_{xx}$, $V_{yy}$, $V_{zz}$, $V_{xz}$, and $V_{zx}$. The tool may output the tensor to the signal processor after each azimuthal measurement or after each of the N azimuthal measurements has been taken.

The signal processor computes a geosignal from the components decoupled from the signal and relative dip angle for the bottom bin data (303). The geosignal for the components $V_{xx}$, $V_{yy}$, $V_{zz}$, $V_{xz}$, and $V_{zx}$ of a receiver response at an azimuth angle θ, and a formation dip angle α is calculated with the formula previously depicted in Equation 1.

The signal processor plots the phase and/or attenuation of the calculated geosignal (305). The phase and/or attenuation can be plotted with respect to the measured depth corresponding to the calculated geosignal. The phase and/or attenuation may be plotted in a singular plot for the bottom bin, plotted for a group of bins in addition to the bottom bin (e.g., bins 16 through 32 for N=32 bins), plotted for both a combination of bins which includes the bottom bin, etc. For instance, the phase and/or attenuation can be plotted as a function with respect to the measured depth. The phase and/or attenuation can also be plotted as a heat map indicating the values of the phase and/or attenuation with respect to the measured depth for one or more data bins. When evaluating the geosignal properties, the phase or attenuation may be evaluated individually or in combination.

The signal processor determines one or more geosignal thresholds for evaluation (307). A geosignal evaluation threshold may be enforced for determining whether a phase and/or attenuation of a small magnitude can be attributed to noise. Geosignal thresholds may also be enforced for determining a minimum phase and/or attenuation at which the results are indicative of the tool position with respect to tool boundaries. The geosignal thresholds are implemented in subsequent steps for inferring position of the tool. Thresholds can be predetermined prior to collecting or loading receiver response data at each logging point or after calculating the geosignal. For instance, after calculating the geosignal, a geosignal phase threshold of four degrees may be established. A geosignal attenuation threshold of two decibels may also be established. Because phase and/or attenuation may be negative, absolute values may be considered when determining whether the geosignal threshold is satisfied. Thresholds can be based on past observations resulting from geosignal evaluation operations.

The signal processor determines whether the phase and/or attenuation are sufficiently small to indicate that the tool is far from formation boundaries (309). The determination that the phase and/or attenuation are sufficiently small can be based on an enforced geosignal threshold. For instance, the geosignal threshold may be a maximum magnitude at which the phase and/or attenuation can be leveraged as a basis for inferring that the tool is approaching a formation boundary and therefore are not considered to be sufficiently small. An initial evaluation threshold may also be enforced to determine whether the small magnitude of the observed phase and/or attenuation can be attributed to noise or other sources of variation which are not a direct result of formation characteristics.

If the phase and/or attenuation are considered to be sufficiently small, the signal processor indicates that the tool is determined to be far from formation boundaries (311). The tool may be far from a boundary if it is not actively approaching a boundary, if the resistivity of the formation layer bordering the nearest formation boundary cannot be detected, etc. As described above, it is not necessary to generate an explicit indication that the tool is far from a formation boundary or not at an inferred location that corresponds to a geosteering decision.

If the phase and/or attenuation are not sufficiently small, the signal processor determines if the phase and/or attenuation at the current measured depth display a local extremum (313). Local extrema may be negative or positive. The phase and/or attenuation observed at the measured depths preceding the current measured depth may be evaluated to determine if a local extremum is present. Local extrema can be determined by evaluating the phase and/or attenuation observed at measured depths within a window created by two consecutive points at which the phase and/or attenuation is equal to the geosignal threshold. For example, if the geosignal attenuation threshold is three decibels, the window may be created between the consecutive points at which the attenuation is observed to be equal to three decibels. The local extremum can then be determined by evaluating the observed attenuation within the resulting window.

If the phase and/or attenuation display a local extremum, the signal processor indicates that the tool is determined to be crossing a formation boundary (315). The presence of a local extremum indicates that the tool is located at a formation boundary between two formation layers, each of which have a different resistivity. For instance, the tool may be crossing between a formation layer with a low resistivity and a formation layer with a high resistivity. As an example, the tool may be crossing from an upper layer with a resistivity of 0.5 Ω·m to a lower layer with a resistivity of 4 Ω·m.

If the phase and/or attenuation do not display a local extremum, the signal processor determines whether the phase and/or attenuation are negative or positive (317). The determination can be made based on evaluating the plotted phase and/or attenuation for the bottom bin at the current measured depth.

If the phase and/or attenuation are negative for the bottom bin, the signal processor indicates that the tool is determined to be near a formation boundary (319). The formation profile for the formation layers on each side of the proximate formation boundary can also be determined upon conclusion that the tool is near the boundary. A negative phase and/or attenuation indicates that the proximate formation boundary is between an upper layer with a lower resistivity and a lower layer with a higher resistivity. The results of the phase and/or attenuation analysis can be leveraged when determining whether to geosteer a drill bit of the tool towards the lower layer which exhibits the higher resistivity or to remain in the upper layer which exhibits the lower resistivity.

If the phase and/or attenuation are positive for the bottom bin, the signal processor indicates that the tool is determined to be near a formation boundary (321). The formation profile for the formation layers on each side of the proximate formation boundary can also be determined upon conclusion that the tool is near the boundary. A positive phase and/or attenuation indicates that the proximate formation boundary is between an upper layer with a higher resistivity and a lower layer with a lower resistivity. The results of the phase and/or attenuation analysis can be leveraged when determining whether to geosteer the drill bit towards the lower layer which exhibits a lower resistivity or to remain in the upper layer which exhibits the higher resistivity.

Example Results

Figure 4:
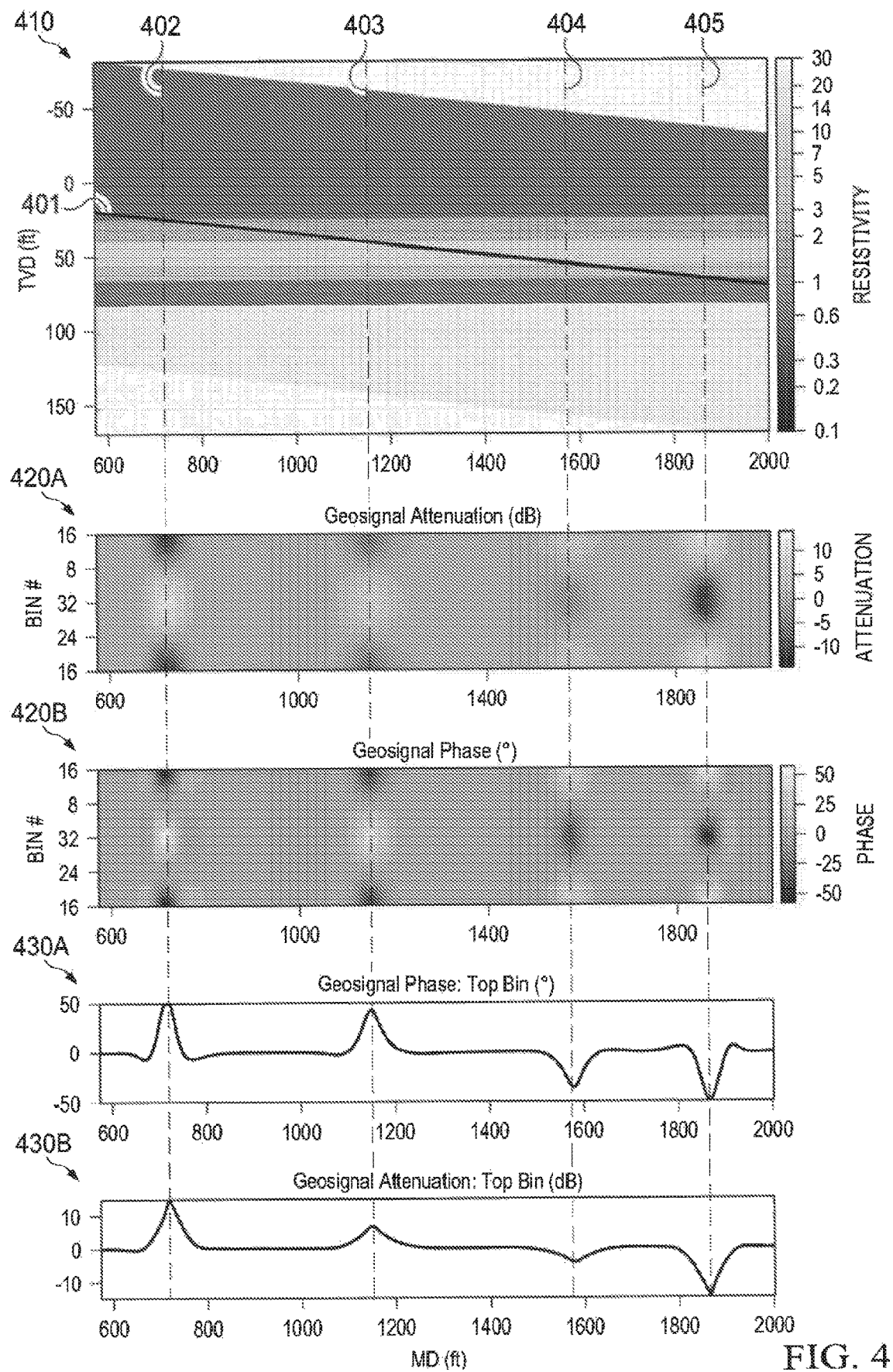
FIG. 4 depicts phase and attenuation of a geosignal calculated during LWD operations in a six-layer formation model.

FIG. 4 depicts phase and attenuation of a geosignal calculated during LWD operations in a six-layer formation model. The geosignal is calculated using Equation 1 as described previously. FIG. 4 depicts an example display (e.g., geosteering interface) that graphically depicts the six-layer formation model 410 with an example tool trajectory 401, geosignal images 420A-B, and geosignal plots 430A-B for N=32. The tool trajectory 401 corresponds to an example trajectory of a downhole resistivity tool during geosteering operations in the formation model 410. The tool trajectory 401 crosses a formation boundary at boundary points 402-405. The geosignal images 420A-B include the bin number corresponding to the calculated geosignal on the left y-axis and observed phase and attenuation on the right y-axis. The geosignal plots 430A-B include the observed phase and attenuation along the y-axis. Each of the formation model 410, geosignal images 420A-B, and geosignal plots 430A-B include measured depth on the x-axis.

Increases and decreases in the phase and attenuation are observed when the tool trajectory 401 is near or intersects each of the boundary points 402-405, which indicate events in which the tool is near or approaching a formation boundary. For instance, the boundary point 402 is between an upper layer with a resistivity of approximately 0.5 Ω·m and a lower layer with a resistivity of approximately 2 Ω·m. When the tool trajectory 401 intersects boundary point 402, the observed phase and attenuation display an extremum, as shown in the geosignal plots 430A-B. The phase and attenuation corresponding to the tool trajectory 401 immediately preceding and following the intersection with boundary point 402 are positive for bin 32 and negative for bin 16, which are the top and bottom bins, respectively. As described with reference to FIGS. 2 and 3, when the phase and attenuation are positive for the top bin and negative for the bottom bin, it is determined that the tool is near a boundary between an upper layer with lower resistivity and a lower layer with higher resistivity. Additionally, when the tool trajectory 401 intersects boundary point 404, the observed phase and attenuation display an extremum, as shown in the geosignal plots 430A-B. The phase and attenuation corresponding to the tool trajectory 401 immediately preceding and following the intersection with boundary point 404 are negative for bin 32 and positive for bin 16, which are the top and bottom bins, respectively. Similarly, as described with reference to FIGS. 2 and 3, when the phase and attenuation are negative for the top bin and positive for the bottom bin, it is determined that the tool is near a boundary between an upper layer with higher resistivity and a lower layer with lower resistivity.

Example Drilling Application

Figure 5:
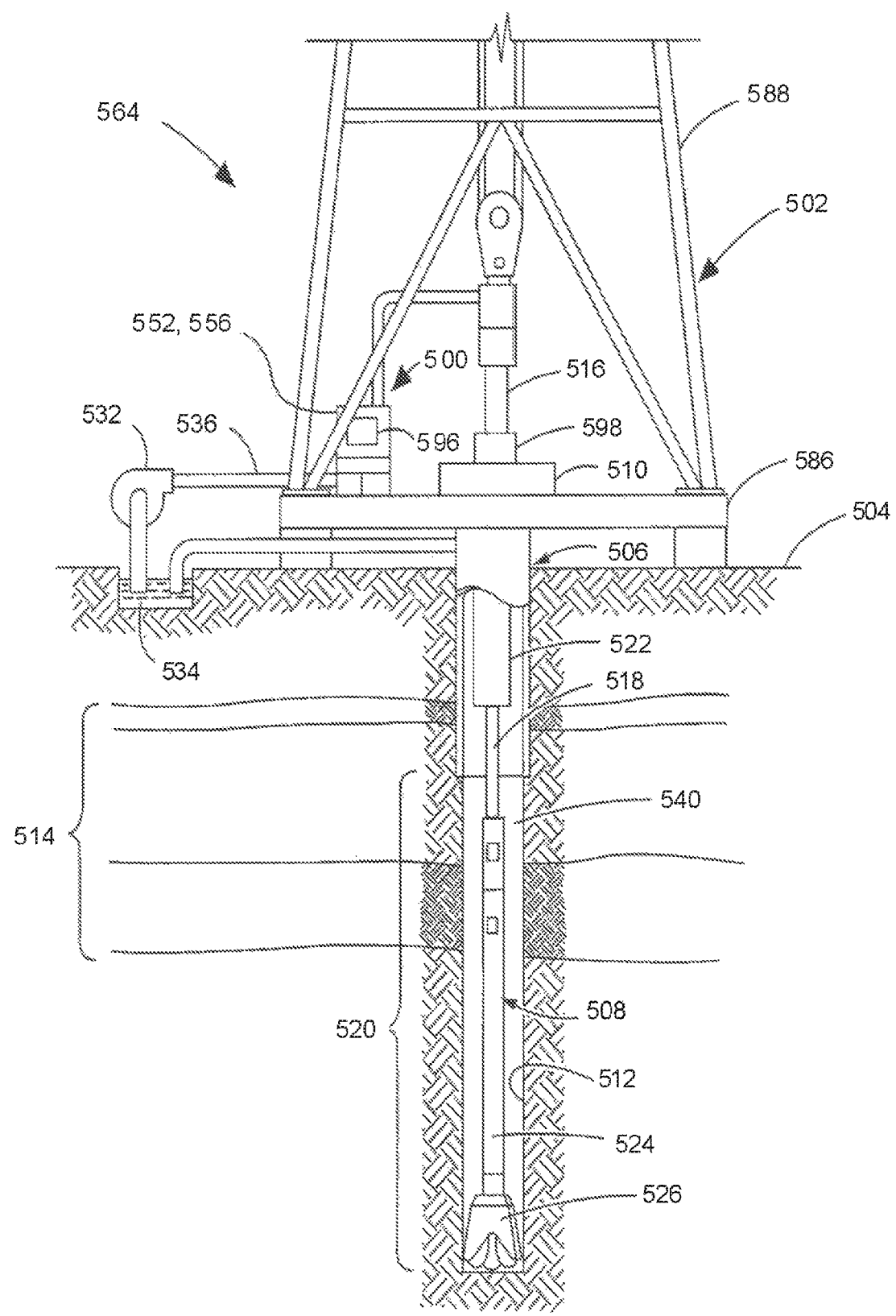
FIG. 5 is a schematic diagram of a drilling rig system.

FIG. 5 is a schematic diagram of a drilling rig system. For example, in FIG. 5, it can be seen how a system 564 may also form a portion of a drilling rig 502 located at the surface 504 of a well 506. Drilling of oil and gas wells is commonly carried out using a string of drill pipes connected together so as to form a drilling string 508 that is lowered through a rotary table 510 into a wellbore or borehole 512. Here, a drilling platform 586 is equipped with a derrick 588 that supports a hoist. The system 564 can include the various examples of a rotating resistivity tool for geosteering described herein. For example, the rotating resistivity tool can be part of a bottom hole assembly 520 to emit and detect electromagnetic signals during rotational drill operations (e.g, during LWD operations).

The drilling rig 502 may thus provide support for the drill string 508. The drill string 508 may operate to penetrate the rotary table 510 for drilling the borehole 512 through subsurface formations 514. The drill string 508 may include a Kelly 516, drill pipe 518, and the bottom hole assembly 520, perhaps located at the lower portion of the drill pipe 518.

The bottom hole assembly 520 may include drill collars 522, a down hole tool 524, and a drill bit 526. The drill bit 526 may operate to create a borehole 512 by penetrating the surface 504 and subsurface formations 514. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 510. In addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 514.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 512. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 514 cuttings created by operating the drill bit 526.

Example Wireline Application

Figure 6:
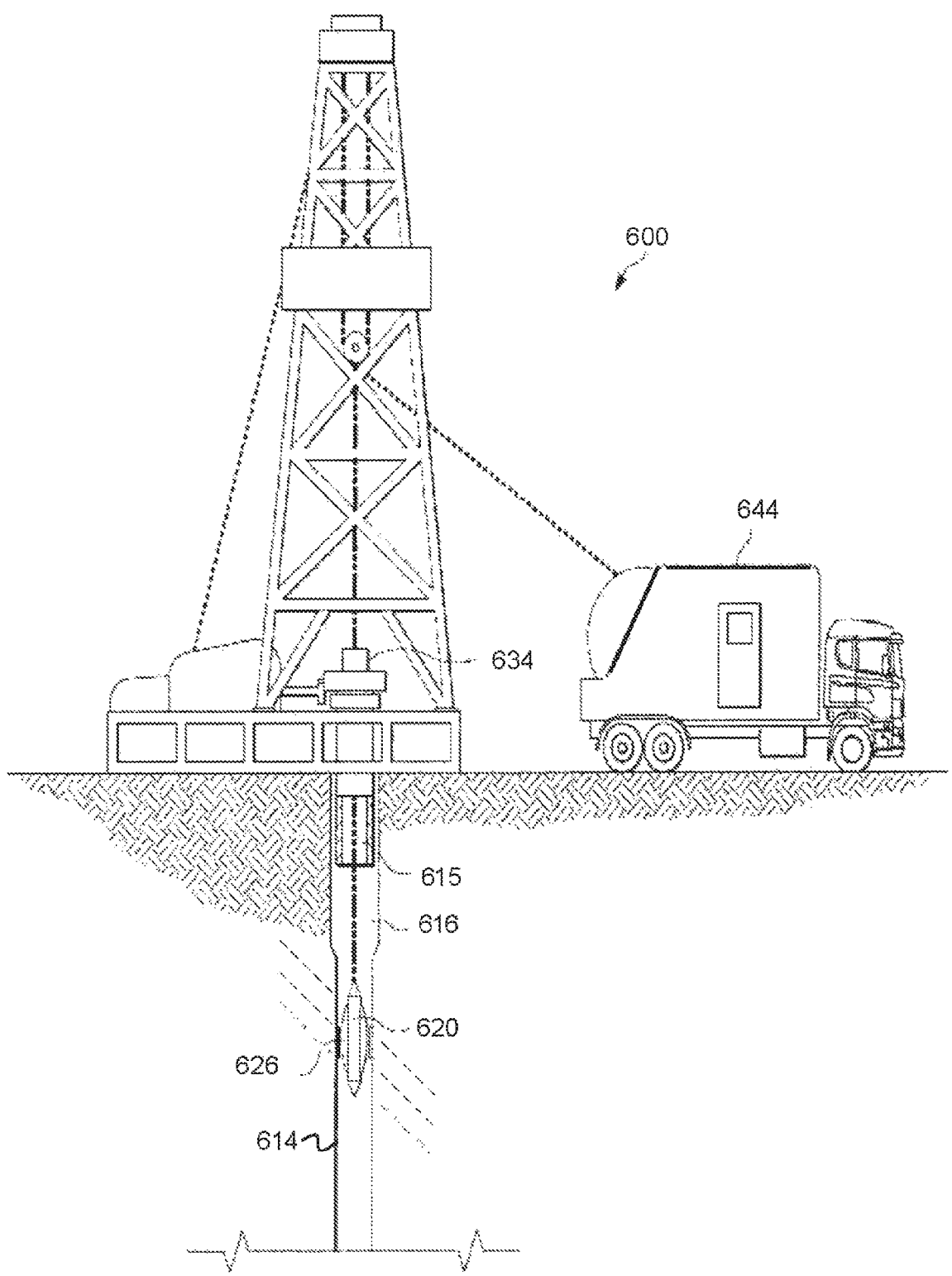
FIG. 6 depicts a schematic diagram of a wireline system.

FIG. 6 depicts a schematic diagram of a wireline system. A rotating resistivity tool can be incorporated into downhole systems such as wireline or slickline systems as illustrated in FIG. 6. A system 600 can be used in an illustrative logging environment with a drillstring removed, in accordance with some embodiments of the present disclosure.

Subterranean operations may be conducted using a wireline system 620 once the drillstring has been removed, though, at times, some or all of the drillstring may remain in a borehole 614 during logging with the wireline system 620. The wireline system 620 may include one or more logging tools 626 that may be suspended in the borehole 614 by a conveyance 615 (e.g., a cable, slickline, or coiled tubing). The logging tool 626 may be communicatively coupled to the conveyance 615. The conveyance 615 may contain conductors for transporting power to the wireline system 620 and telemetry from the logging tool 626 to a logging facility 644. Alternatively, the conveyance 615 may lack a conductor, as is often the case using slickline or coiled tubing, and the wireline system 620 may contain a control unit 634 that contains memory, one or more batteries, and/or one or more processors for performing operations and storing measurements.

In certain embodiments, the control unit 634 can be positioned at the surface, in the borehole (e.g., in the conveyance 615 and/or as part of the logging tool 626) or both (e.g., a portion of the processing may occur downhole and a portion may occur at the surface). The control unit 634 may include a control system or a control algorithm. In certain embodiments, a control system, an algorithm, or a set of machine-readable instructions may cause the control unit 634 to generate and provide an input signal to one or more elements of the logging tool 626, such as the sensors along the logging tool 626. The input signal may cause the sensors to be active or to output signals indicative of sensed properties. The logging facility 644 (shown in FIG. 6 as a truck, although it may be any other structure) may collect measurements from the logging tool 626, and may include computing facilities for controlling, processing, or storing the measurements gathered by the logging tool 626. The computing facilities may be communicatively coupled to the logging tool 626 by way of the conveyance 615 and may operate similarly to the control unit 634. In certain example embodiments, the control unit 634, which may be located in logging tool 626, may perform one or more functions of the computing facility.

The logging tool 626 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Variations

The examples often refer to a "signal processor." The signal processor is a construct used to refer to implementation of functionality for calculating a geosignal and determining tool location and/or formation properties based on evaluation of the geosignal. This construct is utilized since numerous implementations are possible. A signal processor may be a particular component or components of a machine (e.g., a particular circuit card enclosed in a housing with other circuit cards/boards), machine-executable program or programs, firmware, a circuit card with circuitry configured and programmed with firmware, etc. The term is used to efficiently explain content of the disclosure. Although the examples refer to operations being performed by a signal processor, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIGS. 2 and 3, the operation depicted in blocks 203, 205 and 303, 305 can be performed for each azimuth angle at which a resistivity tool receiver detected a signal or for a single azimuth angle (e.g., a top or bottom data bin). It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
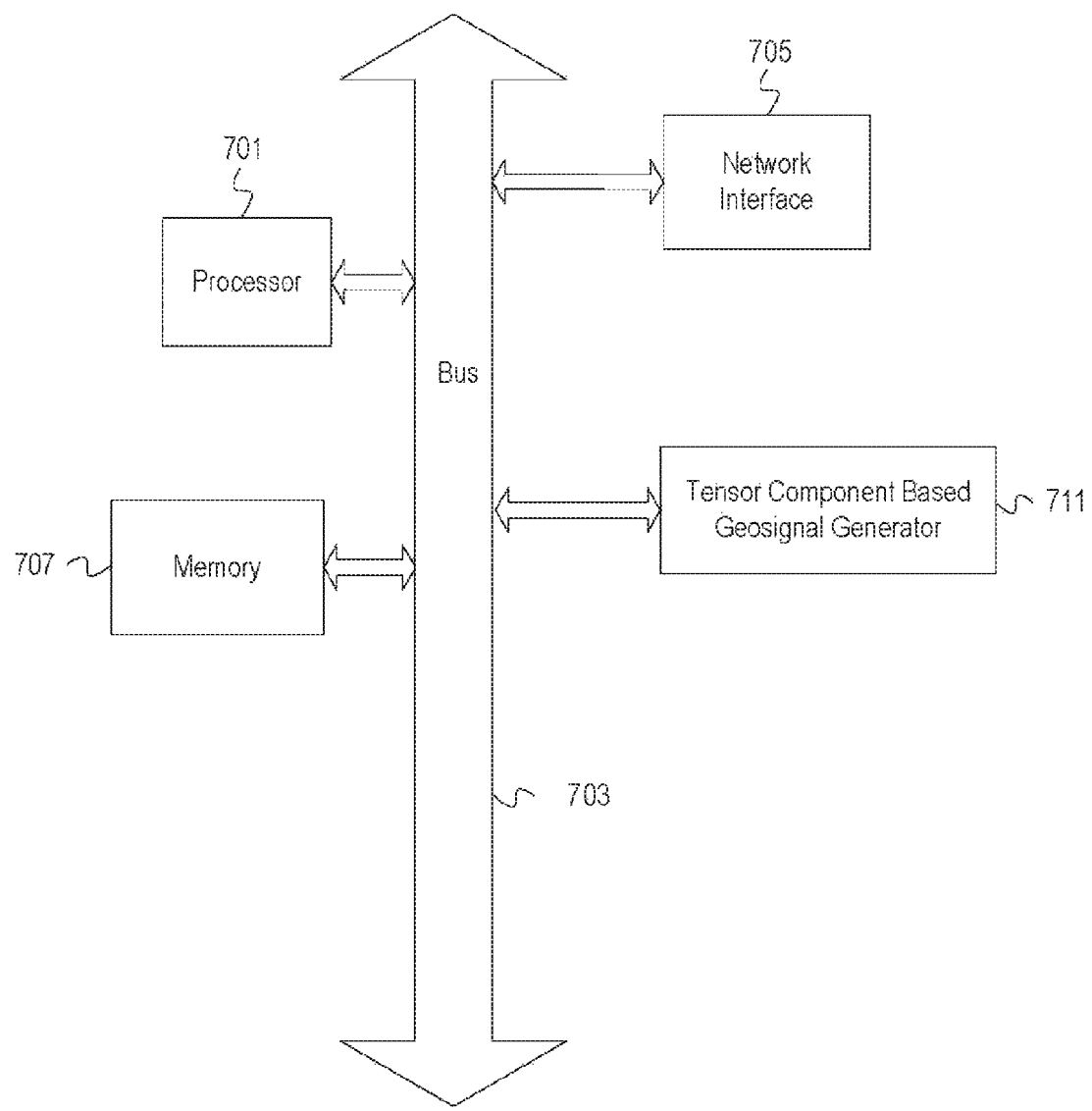
FIG. 7 depicts an example computer system with a tensor component based geosignal generator.

FIG. 7 depicts an example computer system with a tensor component based geosignal generator. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a tensor component based geosignal generator 711. The tensor component based geosignal generator 711 calculates a geosignal and infers tool location and/or formation properties relative to formation boundaries based on evaluation of the geosignal. The tensor component based geosignal generator 711 may be downhole or at a formation surface. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701. While depicted as a computer, some embodiments can be any type of device or apparatus to perform operations described herein.

While the aspects of the disclosure are described with reference to various implementations and exploitations, it will be understood that these aspects are illustrative and that the scope of the claims is not limited to them. In general, techniques for determining tool location and/or formation properties based on calculation an analysis of a geosignal for geosteering operations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

A method comprises obtaining nonzero tensor components decoupled from a signal detected at a first azimuth angle of a downhole tool. A geosignal value is computed based, at least in part, on the nonzero tensor components, the first azimuth angle, and a relative dip angle of the downhole tool. An inferred location of the downhole tool with respect to a formation boundary is determined based, at least in part, on the geosignal value and a first threshold. The inferred location is indicated.

The method further comprises determining that the geosignal value does not satisfy the first threshold. Based on the determination that the geosignal value does not satisfy the first threshold, it is determined whether at least one of attenuation and phase of the geosignal value is a local extremum. Determining the inferred location comprises determining the downhole tool is crossing a formation boundary based on a determination that the geosignal value is a local extremum.

Determining the inferred location of the downhole tool comprises determining whether the geosignal value satisfies the first threshold.

Determining the inferred location of the downhole tool with respect to a formation boundary comprises determining that the downhole tool is far from a formation boundary based, at least in part, on a determination that the geosignal value does not satisfy the first threshold.

The first threshold indicates a magnitude of attenuation or phase of a geosignal that corresponds to a formation boundary.

The method further comprises determining that the geosignal value does not satisfy the first threshold. Based on the determination that the geosignal value does not satisfy the first threshold, it is determined whether a property value of the geosignal value is a local extremum. Based on a determination that the property value of the geosignal value is not a local extremum, it is determined whether the downhole tool is near a formation boundary between a higher resistivity upper layer and a lower resistivity lower layer or between a higher resistivity lower layer and a lower resistivity upper layer, based on sign of the property value.

Indicating the inferred location comprises updating a graphical user interface to indicate whether the downhole tool is near or crossing a formation boundary.

A set of one or more properties of the geosignal value comprises at least one of phase or attenuation of the geosignal value.

The method further comprises steering the downhole tool based on the indication of the inferred location.

One or more non-transitory machine-readable media comprise program code executable by a processor to cause a device to perform operations comprising obtaining nonzero tensor components decoupled from a signal detected at a first azimuth angle of a downhole tool. A geosignal value is calculated with at least a subset of the nonzero tensor components, the first azimuth angle, and a relative dip angle of the downhole tool. An inferred location of the downhole tool with respect to a formation boundary is determined based, at least in part, on the geosignal value and a first threshold. The inferred location is indicated.

Calculating the geosignal value comprises calculating the geosignal value as, $$V_r^{geo} = \frac{\left(-\sin\frac{\alpha}{2}\sin\frac{3\alpha}{2}\cos^2\phi_i V_{xx} - \sin\frac{\alpha}{2}\sin\frac{3\alpha}{2}\sin^2\phi_i V_{yy} - \cos\frac{3\alpha}{2}\cos\frac{\alpha}{2} V_{zz} + \sin\frac{\alpha}{2}\cos\frac{3\alpha}{2}\cos\phi_i V_{xz} + \sin\frac{3\alpha}{2}\cos\frac{\alpha}{2}\cos\phi_i V_{zx}\right)}{\left(-\sin\frac{\alpha}{2}\sin\frac{3\alpha}{2}\cos^2\phi_i V_{xx} - \sin\frac{\alpha}{2}\sin\frac{3\alpha}{2}\sin^2\phi_i V_{yy} - \cos\frac{3\alpha}{2}\cos\frac{\alpha}{2} V_{zz} + \sin\frac{3\alpha}{2}\cos\frac{\alpha}{2}\cos\phi_i V_{xz} + \sin\frac{\alpha}{2}\cos\frac{3\alpha}{2}\cos\phi_i V_{zx}\right)}$$

where $V_r^{geo}$ represents the geosignal value, $\alpha$ represents the relative dip angle, $V_{ij}$ represents a tensor component of the detected signal for an orientation of a receiver in a direction j when the receiver receives the signal as a result of a transmitter oriented in a direction i transmitting a signal into a formation, and $\Phi_i$ represents the first azimuth angle corresponding to position i.

The operations further comprise determining that the geosignal value does not satisfy the first threshold. Based on the determination that the geosignal value does not satisfy the first threshold, it is determined whether at least one of attenuation and phase of the geosignal value is a local extremum. Determining the inferred location comprises determining the downhole tool is crossing a formation boundary based on a determination that the geosignal value is a local extremum.

Determining the inferred location of the downhole tool comprises determining whether the geosignal value satisfies the first threshold.

Determining the inferred location of the downhole tool with respect to a formation boundary comprises determining that the downhole tool is far from a formation boundary based, at least in part, on a determination that the geosignal value does not satisfy the first threshold.

The first threshold indicates a magnitude of attenuation or phase of a geosignal that corresponds to a formation boundary.

The operations further comprise determining that the geosignal value does not satisfy the first threshold. Based on the determination that the geosignal value does not satisfy the first threshold, it is determined whether a property value of the geosignal value is a local extremum. Based on a determination that the property value of the geosignal value is not a local extremum, it is determined whether the downhole tool is near a formation boundary between a higher resistivity upper layer and a lower resistivity lower layer or between a higher resistivity lower layer and a lower resistivity upper layer, based on sign of the property value.

Indicating the inferred location comprises updating a graphical user interface to indicate whether the downhole tool is near or crossing a formation boundary.

An apparatus comprises a multicomponent tool having at least one transmitter and at least one receiver and a device programmed to obtain nonzero tensor components decoupled from a signal detected at a first azimuth angle of the multicomponent tool, calculate a geosignal value with at least a subset of the nonzero tensor components, the first azimuth angle, and a relative dip angle of the multicomponent tool, determine an inferred location of the multicomponent tool with respect to a formation boundary based, at least in part, on the geosignal value and a first threshold, and indicate the inferred location.

The subset of the nonzero tensor components is five nonzero tensor components.

The device programmed to determine the inferred location of the multicomponent tool comprises the device programmed to determine whether a property of the geosignal value satisfies the first threshold to determine the inferred location as far from a formation boundary or one of near and crossing a formation boundary.

What is claimed is:

1. A method comprising:
   obtaining nonzero tensor components decoupled from multiple signals detected at multiple azimuth angles of a downhole tool;
   computing a geosignal value based, at least in part, on the nonzero tensor components, one of the multiple azimuth angles, and a relative dip angle of the downhole tool;

determining an inferred location of the downhole tool with respect to a formation boundary based, at least in part, on the geosignal value and a first threshold; and
steering the downhole tool based on the inferred location.

2. The method of claim 1 further comprising:
determining that the geosignal value does not satisfy the first threshold;
based on the determination that the geosignal value does not satisfy the first threshold, determining whether at least one of attenuation and phase of the geosignal value is a local extremum; and
wherein determining the inferred location comprises determining that the downhole tool is crossing the formation boundary based on the determination that the least one of attenuation and phase of the geosignal value is the local extremum.

3. The method of claim 1, wherein determining the inferred location of the downhole tool comprises determining whether the geosignal value satisfies the first threshold.

4. The method of claim 3, wherein determining the inferred location of the downhole tool comprises determining that the downhole tool is far from the formation boundary based, at least in part, on a determination that the geosignal value satisfies the first threshold.

5. The method of claim 4, wherein the first threshold indicates a magnitude of attenuation or phase of a geosignal that corresponds to the formation boundary.

6. The method of claim 1 further comprising:
determining that the geosignal value does not satisfy the first threshold;
based on the determination that the geosignal value does not satisfy the first threshold, determining whether a property value of the geosignal value is a local extremum; and
based on the determination that the property value of the geosignal value is not the local extremum, determining whether the downhole tool is near the formation boundary between a higher resistivity upper layer and a lower resistivity lower layer or between a higher resistivity lower layer and a lower resistivity upper layer, based on a sign of the property value.

7. The method of claim 1, wherein determining the inferred location comprises updating a graphical user interface to indicate whether the downhole tool is near or crossing the formation boundary.

8. The method of claim 1, wherein a set of one or more properties of the geosignal value comprises at least one of phase or attenuation of the geosignal value.

9. One or more non-transitory machine-readable media comprising program code executable by a processor to cause a device to perform operations comprising:
obtaining nonzero tensor components decoupled from multiple signals detected at multiple azimuth angles of a downhole tool;
calculating a geosignal value with at least a subset of the nonzero tensor components, one of the multiple azimuth angles, and a relative dip angle of the downhole tool;
determining an inferred location of the downhole tool with respect to a formation boundary based, at least in part, on the geosignal value and a first threshold; and
steering the downhole tool based on the inferred location.

10. The one or more non-transitory machine-readable media of claim 9, wherein calculating the geosignal value comprises calculating the geosignal value using an equation wherein the subset of the nonzero tensor components includes $V_{xx}$, $V_{xz}$, $V_{yy}$, $V_{zy}$, and $V_{zz}$ and wherein the equation also includes $\Phi_i$, which represents each of the multiple azimuth angles corresponding to position i.

11. The one or more non-transitory machine-readable media of claim 9, wherein the operations further comprise:
determining that the geosignal value does not satisfy the first threshold;
based on the determination that the geosignal value does not satisfy the first threshold, determining whether at least one of attenuation and phase of the geosignal value is a local extremum; and
wherein determining the inferred location comprises determining that the downhole tool is crossing the formation boundary based on the determination that the at least one of attenuation and phase of the geosignal value is the local extremum.

12. The one or more non-transitory machine-readable media of claim 9, wherein determining the inferred location of the downhole tool comprises determining whether the geosignal value satisfies the first threshold.

13. The one or more non-transitory machine-readable media of claim 12, wherein determining the inferred location of the downhole tool comprises determining that the downhole tool is far from the formation boundary based, at least in part, on the determination that the geosignal value satisfies the first threshold.

14. The one or more non-transitory machine-readable media of claim 13, wherein the first threshold indicates a magnitude of attenuation or phase of a geosignal that corresponds to the formation boundary.

15. The one or more non-transitory machine-readable media of claim 9, wherein the operations further comprise:
determining that the geosignal value does not satisfy the first threshold;
based on the determination that the geosignal value does not satisfy the first threshold, determining whether a property value of the geosignal value is a local extremum; and
based on the determination that the property value of the geosignal value is not the local extremum, determining whether the downhole tool is near the formation boundary between a higher resistivity upper layer and a lower resistivity lower layer, or between a higher resistivity lower layer and a lower resistivity upper layer, based on a sign of the property value.

16. The one or more non-transitory machine-readable media of claim 9, wherein determining the inferred location comprises updating a graphical user interface to indicate whether the downhole tool is near or crossing the formation boundary.

17. An apparatus comprising:
a multicomponent tool having at least one transmitter and at least one receiver; and
a device programmed to:
obtain nonzero tensor components decoupled from multiple signals detected at multiple azimuth angles of the multicomponent tool;
calculate a geosignal value with at least a subset of the nonzero tensor components, one of the multiple azimuth angles, and a relative dip angle of the multicomponent tool;
determine an inferred location of the multicomponent tool with respect to a formation boundary based, at least in part, on the geosignal value and a first threshold; and
steer the multicomponent tool based on the inferred location.

18. The apparatus of claim 17, wherein the subset of the nonzero tensor components is five nonzero tensor components.

19. The apparatus of claim 17, wherein the device programmed to determine the inferred location of the multi-component tool is further programmed to determine whether a property of the geosignal value satisfies the first threshold to determine that the inferred location is far from the formation boundary or one of near and crossing the formation boundary.

* * * * *